United States Patent
Austin et al.

(10) Patent No.: US 6,553,939 B1
(45) Date of Patent: Apr. 29, 2003

(54) METHOD OF CHANGING THE CAGES OF LABORATORY ANIMALS, AND RACKS FOR USE THEREWITH

(75) Inventors: Daryl E. Austin, Newfane, NY (US); Edward J. Horeth, Rochester, NY (US); Gordon N. Leichter, Pittsford, NY (US); James S. Vordonis, Fairport, NY (US)

(73) Assignee: Getinge/Castle, Inc., Rochester, NY (US)

( * ) Notice: Subject to any disclaimer, the term of this patent is extended or adjusted under 35 U.S.C. 154(b) by 0 days.

(21) Appl. No.: 10/071,323

(22) Filed: Feb. 8, 2002

(51) Int. Cl.[7] .................................................. A01K 1/03
(52) U.S. Cl. ..................................................... 119/455
(58) Field of Search ............................... 119/455, 457, 119/476, 475, 456, 465, 454, 449

(56) References Cited

U.S. PATENT DOCUMENTS

| | | | |
|---|---|---|---|
| 4,365,590 A | * 12/1982 | Ruggieri et al. | 119/418 |
| 4,402,280 A | * 9/1983 | Thomas | 119/418 |
| 5,000,120 A | * 3/1991 | Coiro et al. | 119/418 |
| 5,044,316 A | * 9/1991 | Thomas | 119/419 |
| 5,349,923 A | * 9/1994 | Sheaffer et al. | 119/418 |
| 5,385,118 A | * 1/1995 | Coiro et al. | 119/418 |
| 5,513,596 A | * 5/1996 | Coiro et al. | 119/457 |
| 5,823,144 A | * 10/1998 | Edstrom et al. | 119/475 |
| 5,865,144 A | * 2/1999 | Semenuk | 119/456 |
| 5,954,013 A | * 9/1999 | Gabriel et al. | 119/419 |
| 5,996,535 A | * 12/1999 | Semenuk et al. | 119/456 |
| 6,092,487 A | * 7/2000 | Niki et al. | 119/420 |
| 6,158,387 A | * 12/2000 | Gabriel et al. | 119/419 |
| 6,257,171 B1 | * 7/2001 | Rivard | 119/419 |
| 6,293,229 B1 | * 9/2001 | Edstrom, Sr. | 119/482 |
| 6,302,059 B1 | * 10/2001 | Faith et al. | 119/72.5 |
| 6,305,324 B1 | * 10/2001 | Hallock et al. | 119/248 |

* cited by examiner

Primary Examiner—Thomas Price
(74) Attorney, Agent, or Firm—Phillips, Lytle, Hitchcock, Blaine & Huber LLP

(57) ABSTRACT

The method of changing the cage, including a bottom (31), grill (32) and lid (38), of a laboratory animal, includes the steps of: (a) providing a first rack (20) holding at least one clean bottom, grill and lid; (b) removing a clean bottom, grill and lid from said first rack; (c) assembling a clean cage from such bottom, grill and lid; (d) transferring a laboratory animal from a dirty cage to such assembled clean cage; (e) disassembling the dirty cage into its bottom, grill and lid components; (f) providing a second rack (20) having space for holding the dirty cage bottom, grill and lid components; (g) placing said dirty grill and lid on the second rack; (h) washing the dirty grill and lid while mounted on said second rack; (i) removing soiled bedding from the dirty bottom; (j) washing the bottom; (k) placing cleaned bedding in the washed bottom; and (l) placing said washed bottom with cleaned bedding on said second rack; thereby to change the cage of said laboratory animal.

8 Claims, 6 Drawing Sheets

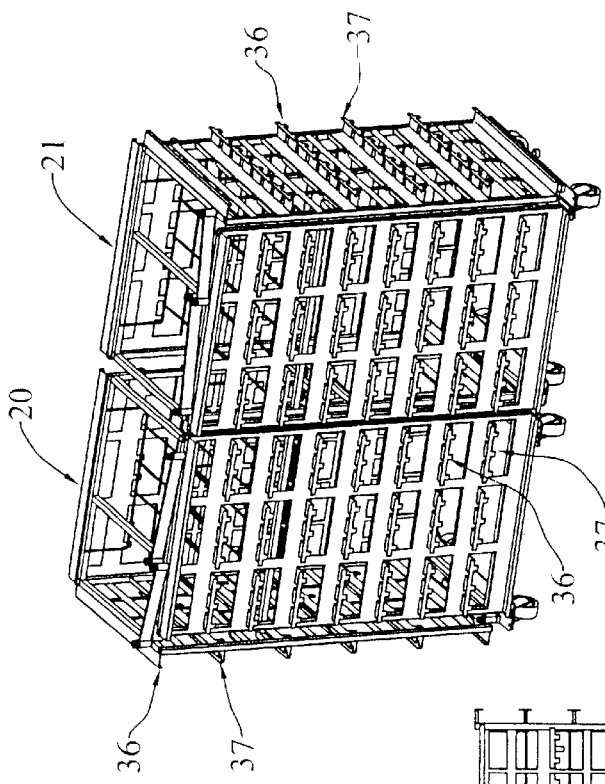
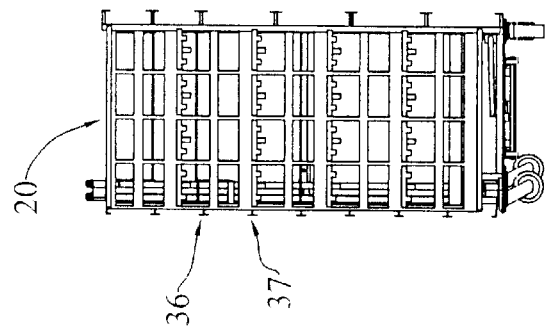
Fig. 5
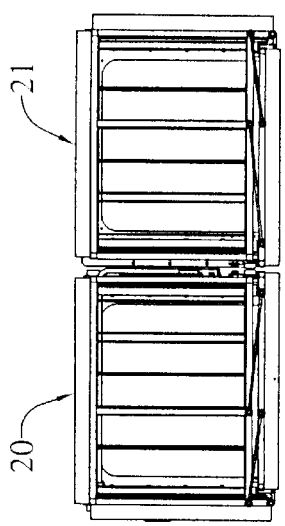
Fig. 6
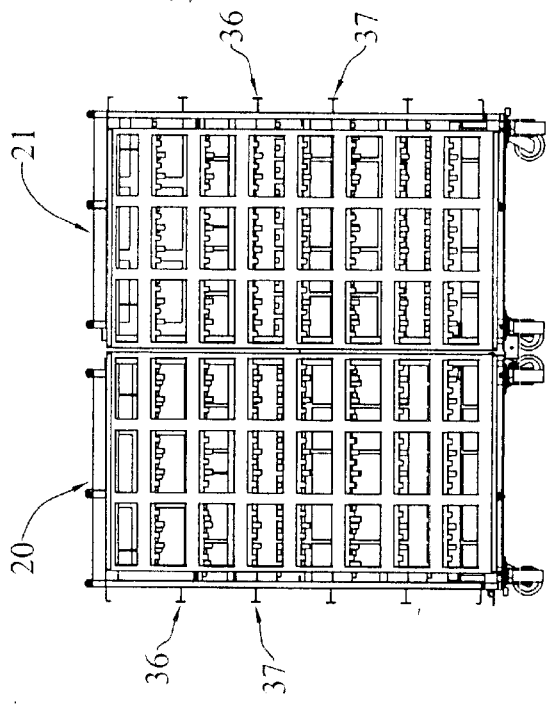
Fig. 4

METHOD OF CHANGING THE CAGES OF LABORATORY ANIMALS, AND RACKS FOR USE THEREWITH

TECHNICAL FIELD

The present invention relates generally to the field of animal husbandry, and, more particularly, to an improved methods of changing and/or cleaning the cages of laboratory animals, and wheeled racks for use of practicing such improved methods.

BACKGROUND ART

There is a recognized need for the use of laboratory animals, such as transgenic mice, to study disease, genetic composition and deficiencies. Mice are commonly stored in cages that consist of three parts: (a) a bottom, usually made of a clear polycarbonate resin plastic material (e.g., Lexan®, made by the General Electric Co.); (b) a grill, supporting food, water bottle and the like; and (c) a lid that snaps to the bottom and that holds the grill in place in the assembled cage. It is common to place clean bedding, such as cedar shavings or the like, in the bottom when the cage is assembled and before a laboratory animal is placed therein. This bedding becomes soiled with passage of time. Hence, it is necessary to periodically change the bedding, and to clean the cage. Often, there are many cages that require such routine servicing. A soiled cage must be disassembled, washed, sterilized and charged with fresh bedding before it is capable for reuse. Robotic arms have been developed to take the disassembled cage bottoms, invert them to dump the soiled bedding therefrom, and to place the upside-down dirty cages on a conveyor that leads to a tunnel washer. Other robotic arms have been developed to receive the cleaned bottoms from a tunnel washer, to invert them so that they are rightside-up, to recharge them with fresh bedding, and to stack them prior to storage.

There is believed to be a continuing need for improved methods of changing and/or cleaning the cages of laboratory animals, and for improved racks for use in practicing these methods.

DISCLOSURE OF THE INVENTION

With parenthetical reference to the corresponding parts, portions or surfaces of the disclosed embodiment, merely for purposes of illustration and not by way of limitation, the present invention provides an improved method of changing and cleaning the cage of a laboratory animal, and provides improved apparatus for use in practicing this method.

In one aspect, the invention provides an improved method of cleaning and/or changing the cage of a laboratory animal, the cage including a bottom (31), a grill (32) and a lid (38). This method broadly includes the steps of: providing a first rack (20) having a first plurality of stations for holding a corresponding plurality of bottoms, grills and lids, the stations holding at least one bottom, grill and lid; removing a bottom, grill and lid from the first rack; assembling a clean cage from the bottom, grill and lid removed from the first rack; providing a dirty cage; disassembling the dirty cage into its bottom, grill and lid components; providing a second rack (20) having a plurality of stations for holding a corresponding plurality of bottoms, grills and lids, this second rack having space for at least one bottom, grill and lid; placing said dirty grill and lid on the second rack; washing the dirty grill and lid while mounted on the second rack; removing soiled bedding from the dirty bottom; washing the dirty bottom; and placing the washed bottom on the second rack; thereby to change and clean the cage of the laboratory animal.

The dirty cage may contain a laboratory animal, and the improved method may include the step of transferring the laboratory animal from the dirty cage to the clean cage. The method may include the additional step of adding clean bedding to the washed bottom prior to its placement on the second rack. Indeed, this method may include the steps of placing the washed bottom on a pallet and transferring the pallet to the second rack. The method may further include the additional step of sterilizing the second rack with the wash bottom, grill and lid thereon. In the illustrated form, the lids are slidably mounted on the second rack.

In a preferred form of the invention, a third rack (21) is provided. This third rack has a plurality of stations for holding a corresponding plurality of bottoms, grills and lids. The second rack (20) is adapted to be selectively coupled to the third rack (21) before the dirty grills and lids are washed. The second and third racks may be uncoupled after the dirty grills and lids have been washed.

In another aspect, the invention provides improved apparatus for use in changing the cages of laboratory animals, each cage including a bottom, a grill and a lid. The improved apparatus broadly includes: a first rack having a plurality of stations for holding a corresponding first plurality of bottoms, grills and lids; a second rack having a second plurality of stations for holding a corresponding second plurality of bottoms, grills and lids; and a coupling mechanism for releasably joining the first and second racks; whereby the first and second racks may be selectively joined or separated. This coupling mechanism may include a hook (40) on one of the racks and a catch (41) on the other of the racks. The coupling mechanism may further include a release mechanism for selectively releasing the hook and catch. This release mechanism may be foot operated.

In still another aspect, the invention provides an improved rack for use in changing the cages of laboratory animals, each cage including a bottom, a grill and a lid. The improved rack broadly includes a vertically-elongated frame having four sides; a panel mounted on the frame for selective movement between a first position at which the panel is arranged substantially parallel to one of the sides and a second position at which the panel is arranged substantially parallel to a second of the sides; whereby the panel may be moved to the second position to expose the interior of the frame.

The improved rack may further include a first link having one end pivotally connected to the frame and having another end pivotally connected to the panel; and a second link having one end pivotally connected to the frame and having another end pivotally connected to the panel. The panel and two of the sides may have slots for receiving and holding the lids. Preferably, one of the frame sides is open to permit wash water to enter the volume within the frame so as wash articles held therein. The frame may have an interior space that is accessible when the panel is in the second position and wherein such interior space may be divided into one area for storing a plurality of grills and another area for storing a plurality of bottoms. In the preferred embodiment, the other area is operatively arranged to receive and store a pallet containing a plurality of bottoms.

Accordingly, the general object of the invention is to provide an improved method of changing and/or cleaning the cage of a laboratory animal.

Another object is to provide improved apparatus for use in changing the cages of laboratory animals, this improved apparatus having first and second racks that are selectively couplable during different stages of the cage-changing operation.

Another object is to provide an improved rack for use in changing the cages of laboratory animals.

Still another object is to provide improved racks for use in an automated cage processing system.

These and other objects and advantageous will become apparent from the foregoing and ongoing written specification, the drawings, and the appended claims.

BRIEF DESCRIPTION OF THE DRAWINGS

FIG. 3 is a reduced-size isometric view of the racks shown in FIGS. 1 and 2, and showing the racks as having been operatively coupled together.

FIG. 4 is a rear elevation of the coupled racks shown in FIG. 3.

FIG. 5 is a right side elevation of the coupled racks shown in FIG. 4.

FIG. 6 is a top plan view of the coupled racks shown in FIGS. 3 and 4, this view showing the panels as being in their closed positions.

DESCRIPTION OF THE PREFERRED EMBODIMENTS

Figure 1:
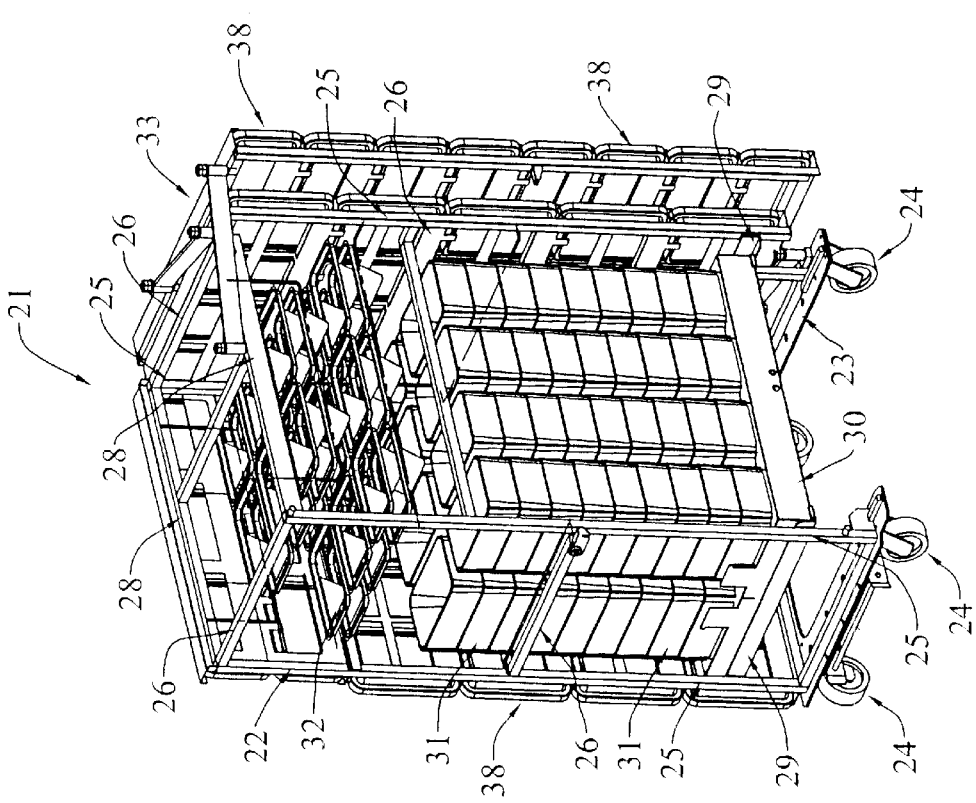
FIG. 1 is an isometric view looking at the right front corner of an improved rack, this being a left-hand rack that is loaded with cages, grills and lids.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
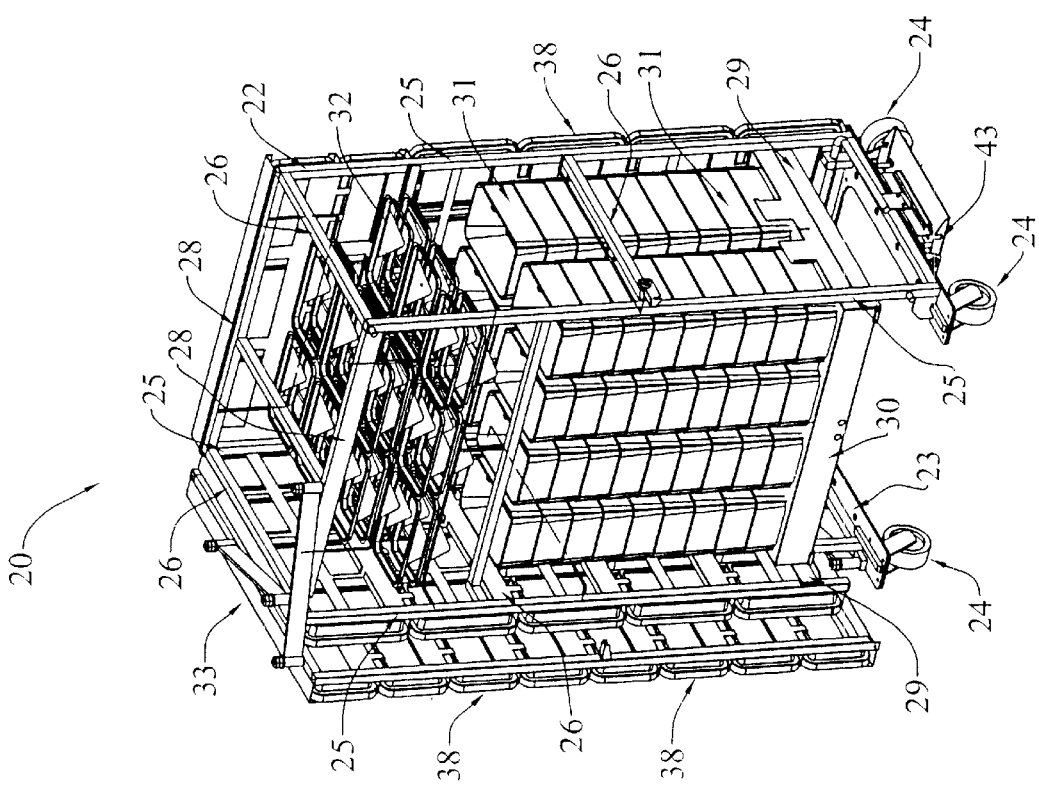
FIG. 2 is an isometric view looking at the left front corner of a right-hand rack that is loaded with bottoms, grills and cages.
Figure 7:
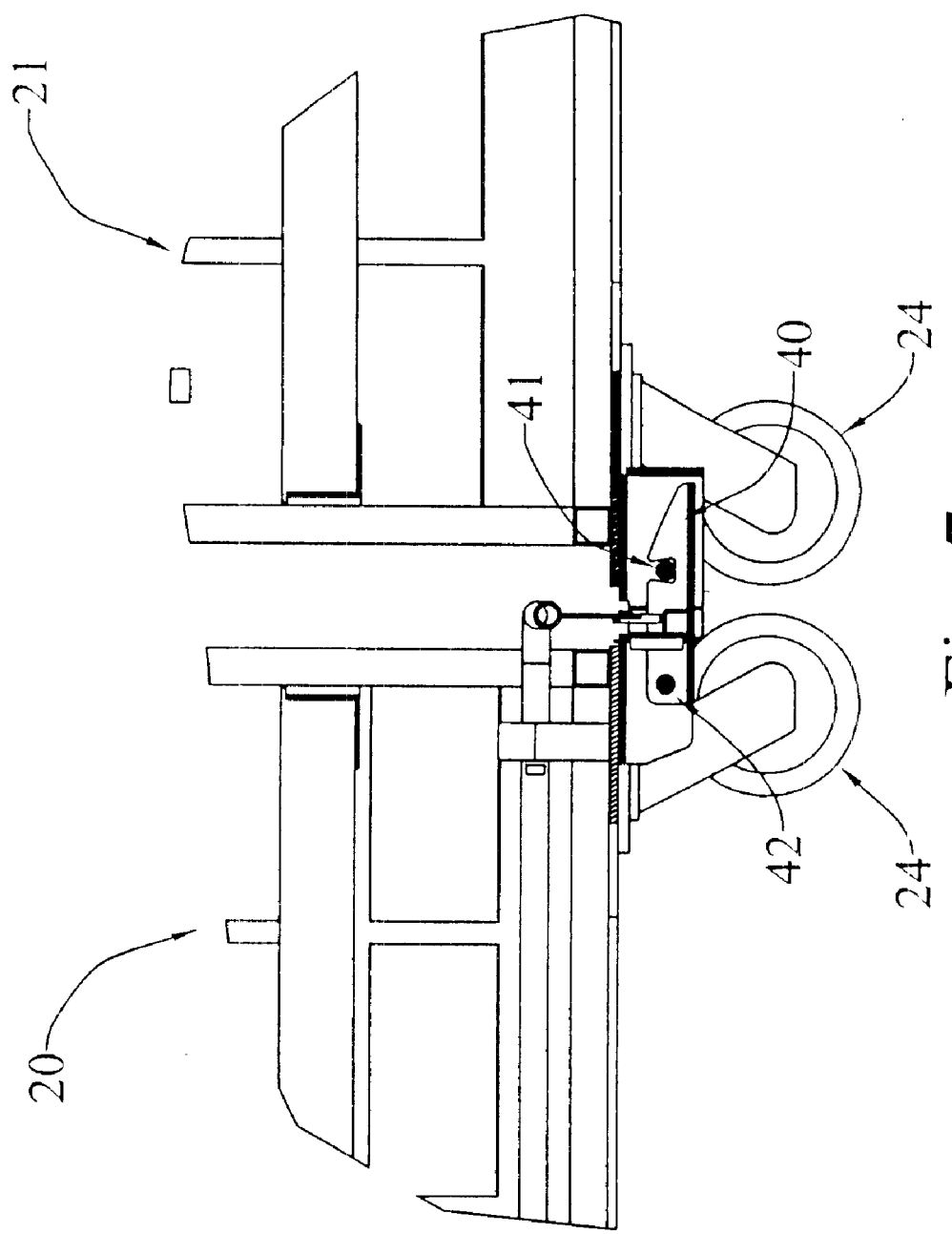
FIG. 7 is a greatly-enlarged detailed view showing the coupling mechanism for selectively and releasably joining the racks.

Referring now to the drawings, and, more particularly, to FIGS. 1 and 2 thereof, the present invention, in one aspect, provides improved racks that are adapted to be selectively coupled together, and that are used for changing and/or cleaning the cages of laboratory animals, such as mice. The present invention will now be described with respect to a cage containing a laboratory animal, such as a mouse. However, it should be clearly understood that the improved method may be used to clean a dirty cage that does not contain a laboratory animal.

FIG. 1 is a perspective view of a left-hand rack, generally indicated at 20. FIG. 2 is a perspective view of a right-hand rack, generally indicated at 21. These two racks are substantially mirror images of one another, except as pertains to the coupling mechanism (described infra). Because the two racks have substantially the same parts, only the left-hand rack will be explicitly described. The same reference numeral will be applied to the right-hand rack in FIG. 2 to identify the corresponding part, portion or surface of that rack.

Referring now to FIG. 1, the left-hand rack 20 is shown as having an upright open frame, generally indicated at 22. This frame includes a U-shaped bottom structure 23 having four freely-rotatable caster wheels, severally indicated at 24, mounted thereon. The frame has four vertical posts, severally indicated at 25, that extend upwardly from the corners of the base; a plurality of left and right horizontal side cross-bars, severally indicated at 26; and front and rear horizontal cross-bars, severally indicated at 28. Thus, the frame is relatively open, and may be freely penetrated by wash water when the rack is placed within a washer.

A pair of left and right inwardly-facing channels, severally indicated at 29, are mounted on the posts to receive and hold a pallet 30 containing a plurality of cage bottoms, severally indicated at 31. In FIG. 1, seventy-two rectangular cup-shaped cage bottoms are shown as being mounted on pallet 30. There are a total of eight vertically-stacked cage bottoms arranged in four rows of two deep, and nine cage bottoms per column, with two bottoms missing, for an aggregate number of seventy-two. This number is determined by the number of lids and grills that may be stored on the rack such that there will be a like plurality of bottoms, grills and lids to assemble a corresponding plurality of cages.

In FIG. 1, a plurality of cage grills, indicated at 32, are mounted on a suitable support in the upper portion of the frame. In the form shown, only fifteen of such grills are shown. However, there is sufficient space in the upper portion of the rack to hold a total of seventy-two of such grills, the same number as the illustrated number of cage bottoms. However, only fifteen of these cage grills are illustrated in FIG. 1 so as to not obfuscate other parts of the invention.

Figure 8:
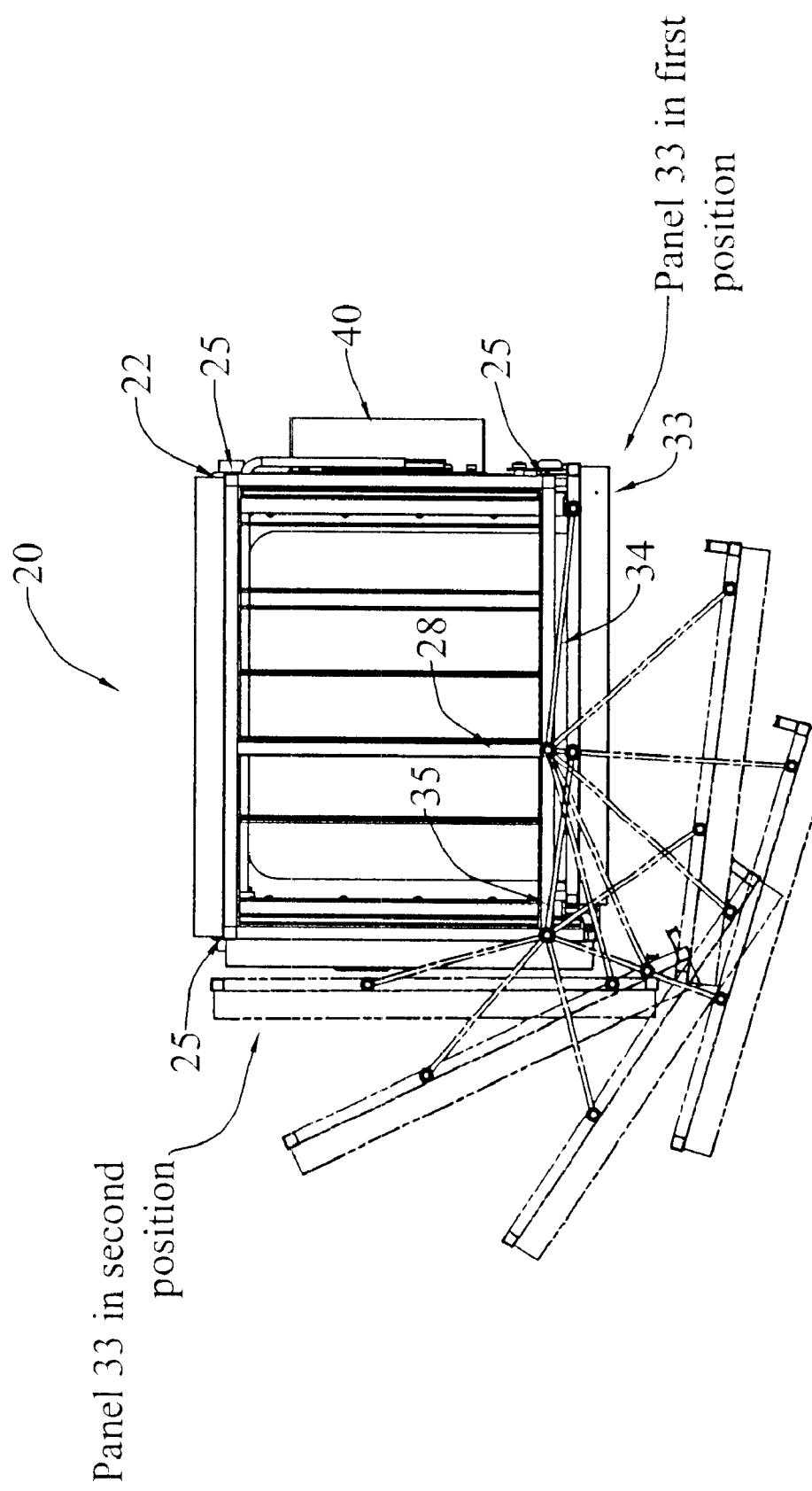
FIG. 8 is an enlarged top plan view of the left-hand rack shown in FIG. 1, showing the kinematic linkage for moving the panel of the left-hand rack between its first and second positions.

Referring now to FIGS. 1 and 8, the rack has a movable front panel, generally indicated at 33, that is adapted to be moved between a first position at which the panel is arranged to close the open front portion of the rack, and a second position at which the panel is adapted to be positioned along side the left side of the panel. These two positions, and the linkage mechanism for moving the panel, is best shown in FIG. 8. More particularly, the linkage mechanism includes a first link 34 and a second link 35 at the upper end of the frame. First link 34 has one end pivotally mounted on the frame upper cross-bar 28, and has its other end pivotally mounted on the panel adjacent its right end thereof (as seen in FIG. 8). The second link 35 has one marginal end portion pivotally mounted on the frame at the upper left-front corner thereof, and its other end pivotally connected to an intermediate portion of the panel. At its lower end, the panel is supported by one of second links 35. In other words, first link 34 is not provided at the bottom of the panel.

FIG. 8 depicts the panel in a number of intermediate positions between its first position (at which the panel closes the open front of the rack), and an out-of-the-way position (at which the panel is positioned substantially parallel to and adjacent the left side thereof).

The movable panel 33, the left side of the rack, and the rear of the rack, are each provided with a plurality of spaced and facing channel-like members 36, 37 that are designed and configured to receive and accommodate sliding insertion of a number of lids, severally indicated at 38. Thus, a plurality of lids may be slid into the channels 36, 37.

Figure 9:
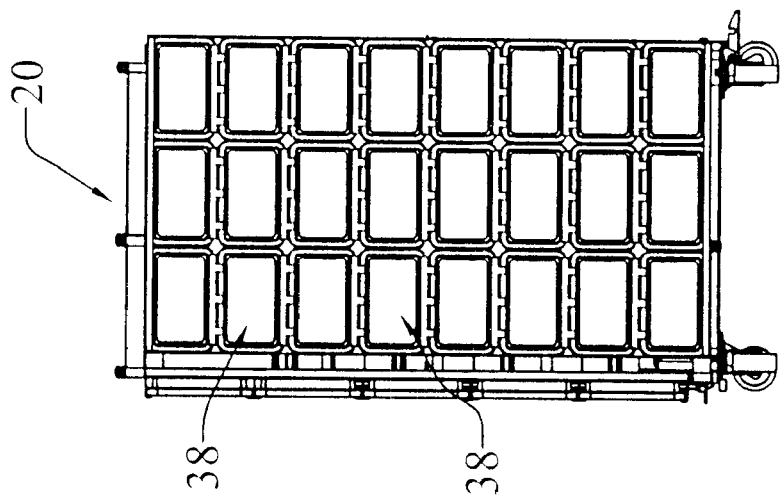
FIG. 9 is a front view of the left-hand rack fully loaded with lids.

FIG. 9 depicts the front of the left rack with the panel in its first position closing the front of the rack. This view illustrates the front panel as having eight vertically-spaced rows of three horizontally-elongated lids each. Thus, twenty-six lids are adapted to be slidably inserted into the tracks in the rear of the rack, twenty lids are adapted to be slid into the tracks on the left side of the rack, and twenty-four lids are adapted to be inserted in the tracks mounted on the panel. It is important to note that the top and the right side of the rack are open so as to allow wash water to circulate within the rack during the washing cycle.

Figure 10:
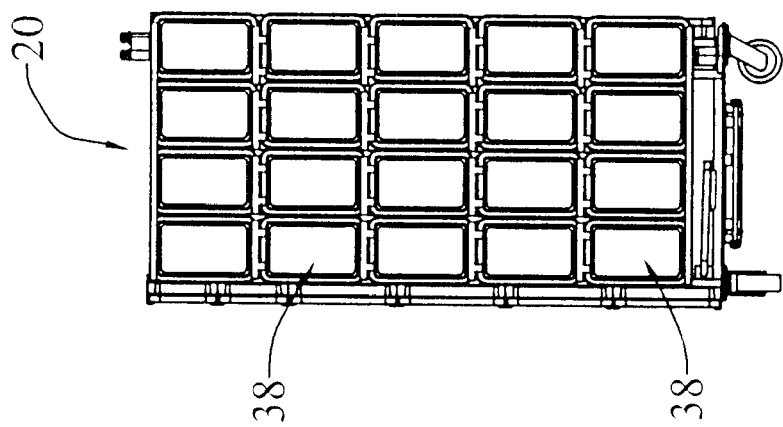
FIG. 10 is a left side elevation of the left-hand rack shown in FIG. 9.

FIG. 10 depicts the left side of the rack. Here, there are five vertically-spaced rows of four vertically-elongated lids each.

Figure 11:
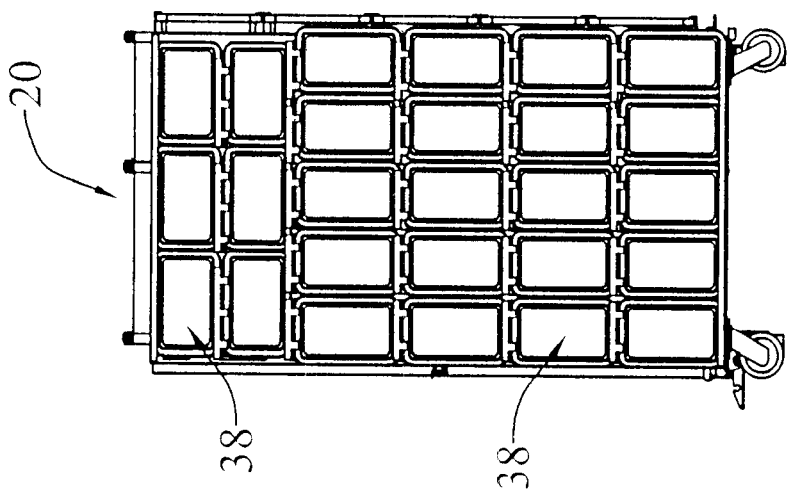
FIG. 11 is a rear elevation of the left-hand rack shown in FIGS. 9 and 10.

FIG. 11 depicts the rear of the rack with the lids positioned thereon. It should be noted that there are four vertically-spaced rows of five each vertically-elongated lids, and two vertically-spaced rows of three horizontally-elongated lids.

As noted above, the right-hand rack 21 is substantially a mirror image of the left-hand twenty shown in FIG. 1. The principal difference lies in the coupling mechanism.

As best shown in FIGS. 1, 2 and 3, the coupling mechanism includes a catch member 40 that extends laterally outwardly from the right end of left-had rack 20, and a latching bar 41 mounted on the left end of right-hand rack 21 that is adapted to be received in a U-shaped recess in catch member 40. The catch member is mounted on the first rack for pivotal movement about an axis 42. In the preferred embodiment, the catch member is biased to move upwardly by a suitable device, such as a spring (not shown). A foot pedal 43 in FIG. 1 may be selectively depressed to lower the catch member and to allow the left-hand rack to be physically separated from the right-hand rack.

Figure 12:
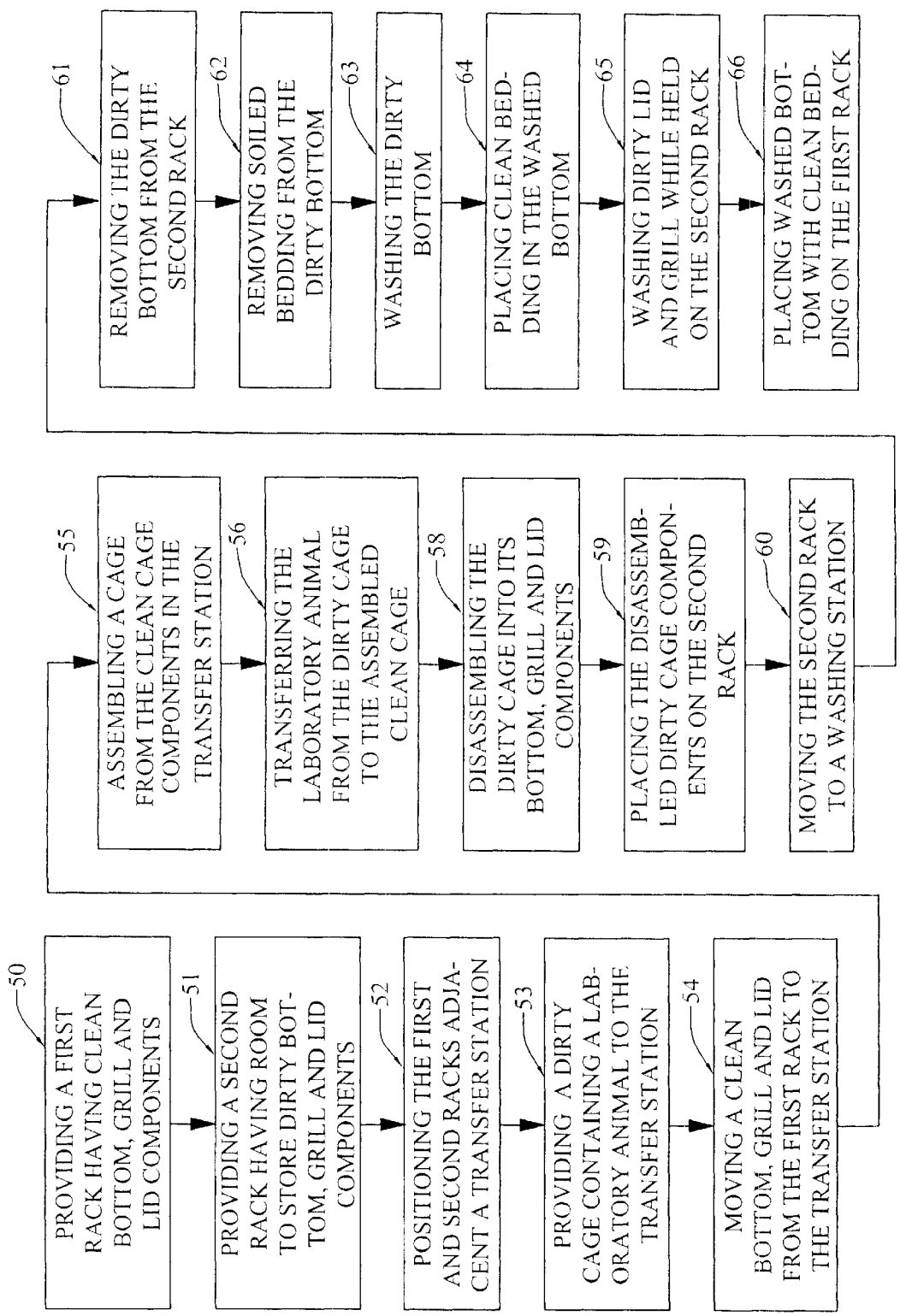
FIG. 12 is a flow chart of the salient steps involved in the improved method.

The method of changing and cleaning laboratory cages of laboratory animals will now be described with reference to the flowchart shown in FIG. 12.

The first step is to provide a first rack, such as indicated at 20, having at least one clean bottom, grill and lid cage components thereon, as indicated in box 50. In practice, the first rack may contain the requisite components for assembling a plurality, perhaps seventy-two, cages. The bottoms are stored on pallet 30, the grills are stored on the rack above the pallets, and the various lids are stored in slots received on the front, left side and rear of the grill.

The method also includes the step of providing a second rack having room to store dirty bottom, grill and cage components, as indicated in box 51. The second rack may be the same as the first rack, and may be completely empty of such components, or may have some components stored thereon, with vacant spaces to store additional components.

The first and second racks are then positioned adjacent a transfer station, as indicated in box 52. This transfer station may possibly have controlled airflow, and the like.

A dirty cage containing soiled bedding and perhaps a laboratory animal, is then provided to the transfer station, as indicated in box 53.

The operator then removes a clean bottom, grill and lid from the first rack, and places it on the transfer station, as indicated in box 54.

The operator then assembles a clean cage from such clean cage components in the transfer station, as indicted in box 55.

The operator then transfers the laboratory animal, if present, from the dirty cage to the assembled clean cage in the transfer station, as indicated in box 56.

The transferred animal in the clean cage is then removed to a different location.

The dirty cage in the transfer station is then disassembled into its bottom, grill and lid components, as indicated in box 58.

The disassembled dirty cage components are then placed on the second rack, as indicated in box 59. In the preferred embodiments, the bottoms are placed on pallet 30, the grills are placed above the pallet, and the various dirty lids are placed in the slots provided on the front, rear and left side of the second rack.

The second rack is then wheeled to a washing station, as indicated in box 60.

The dirty bottom is then removed from the second rack, as indicated in box 61. In practice, there may be a plurality of dirty bottoms stored on pallet 30, and the entire pallet may be removed from the second rack.

Thereafter, the soiled bedding is removed from each dirty bottom, as indicated in box 62. This is typically accomplished by physically inverting the bottom so as to dump the contents therefrom.

Thereafter, the soiled bottoms are washed, as indicated in box 63. In practice, a robot may physically remove one or more of the soiled bottoms from the pallet, invert them so as to dump the soiled bedding therefrom, and place the soiled bottoms in an inverted manner on the conveyor of a tunnel washer. The conveyor advances, and moves the bottoms through the tunnel washer, within which they are washed and cleaned. The cleaned bottoms emerge from the other side of the tunnel washer.

Thereafter, clean bedding is placed in the washed bottoms, as indicated in box 64.

While the bottoms are being washed and recharged with clean bedding, the second rack containing the dirty grill and lids, is moved to a washing station, and is placed in a rack washer, as indicated in box 65. The washer is then operated to wash the grills and lids while physically remaining on the rack. When this step has been completed, the second rack containing the washed grills and lids are removed from the rack washer.

The cleaned bottom with the recharged bedding is then placed on the second rack, as indicated in box 66. In practice, a plurality of cleaned second bottoms may be stacked on a pallet, and the entire pallet may be placed on the second rack.

If the rack is of the form shown in FIG. 1, the front panel is then closed. Thus, the second rack contains washed and cleaned cage components, and is available to be supplied as the first rack to the transfer station on the next subsequent cycle.

Thus, the invention provides an improved method for cleaning and changing the cage of a laboratory animal.

MODIFICATIONS

The present invention contemplates that many changes and modifications may be made.

For example, while the improved method has been described in terms of changing the cage of a laboratory animal, the invention is equally useful to clean a soiled cage, even if the laboratory animal is not present. In this event, the step of transferring the laboratory animal from the dirty cage to the assembled clean cage is simply omitted.

In the preferred embodiment, the bottoms are placed on a pallet, such that a plurality of bottoms may be placed on, and removed from, the racks, as desired. When each cage is assembled, it is preferred to simply withdraw the cage components individually from the first rack. However, when cleaning the cage components, it is preferred to remove the bottoms by means of a pallet such that a large number of bottoms may be physically moved in one operation.

It should also be apparent that the invention provides a unique rack for receiving and storing various cage components. The lids and grills are stored in positions such that they may be washed in the positions on which they were initially placed. The bottoms, which are typically rectangular cup-shaped members, must be inverted to dump the soiled bedding, cleaned, and recharged with fresh bedding before placement back on the rack. Thus, the improved rack provides a storage device for the various cage components, provides a vehicle by which the various cage components may be moved from one location to another, and provides a wash rack to hold the lids and grills in operative positions so that they may be washed while being retained on the rack. This minimizes handling of such cage components.

The physical structure of the racks may be readily changed or modified as desired. For example, only one type of rack need be provided. In other words, there need not necessarily be a left-hand rack and a right-hand rack, for means for releasably coupling these two racks together. While this arrangement is preferred because it allows a single operator to handle a large number of cage components, such as when moving them into or out of a sterilizer, this feature of coupling the racks together is optional and may be omitted if desired.

The physical structure of each rack may be readily changed or modified. It is presently felt that the top and right side of the rack should be opened so as to permit the entrance of wash water therethrough. However, in alternative arrangements in which the cage components are stored differently, this might also be changed.

Therefore, while a presently preferred form of the improved automated cage processing system has been shown and described, and several modifications and changes thereof discussed, persons skilled in this art will readily appreciate that various additional changes and modifications may be made without departing from the spirit of the invention, as defined and differentiated by the following claims.

What is claimed is:

1. The method of changing the cage of a laboratory animal, said cage including a bottom, a grill and a lid, comprising the steps of:

providing a first rack having a plurality of stations for holding a corresponding plurality of bottoms, grills and lids, said stations holding at least one bottom, grill and lid;

removing a bottom, grill and lid from said first rack;

assembling a clean cage from the bottom, grill and lid removed from said first rack;

providing a dirty cage;

disassembling said dirty cage into its bottom, grill and lid components;

providing a second rack having a plurality of stations for holding a corresponding plurality of bottoms, grills and lids, said second rack having space for at least one bottom, grill and lid;

placing said dirty grill and lid on said second rack;

washing said dirty grill and lid while mounted on said second rack;

removing soiled bedding from said dirty bottom, washing said bottom; and placing said washed bottom on said second rack;

thereby to change the cage of said laboratory animal.

2. The method as set forth in claim 1, comprising the further step of:

adding clean bedding to said washed bottom prior to its placement on said second rack.

3. The method as set forth in claim 1 wherein the step of placing said washed bottom on said second rack comprises the steps of:

placing said washed bottom on a pallet; and transferring said pallet to said second rack.

4. The method as set forth in claim 1, and further comprising the additional step of:

sterilizing said second rack with said washed bottom, grill and lid thereon.

5. The method as set forth in claim 1 wherein each lid is slidably on said second rack.

6. The method as set forth in claim 1, comprising the further step of:

providing a third rack having a plurality of stations for holding a corresponding plurality of bottoms, grills and lids; and coupling said second rack to said third rack before said dirty grill and lid are washed.

7. The method as set forth in claim 6, comprising the further step of:

uncoupling said second and third racks after said dirty grill and lid have been washed.

8. The method as set forth in claim 1 wherein said dirty cage contains a laboratory animal, and wherein said method comprises the further step of:

transferring said laboratory animal from said dirty cage to said clean cage.

* * * * *